United States Patent
Quach et al.

(10) Patent No.: US 7,617,329 B2
(45) Date of Patent: Nov. 10, 2009

(54) PROGRAMMABLE PROTOCOL TO SUPPORT COHERENT AND NON-COHERENT TRANSACTIONS IN A MULTINODE SYSTEM

(75) Inventors: Tuan M. Quach, Fullerton, CA (US); Lily P. Looi, Portland, OR (US); Kai Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 10/335,001

(22) Filed: Dec. 30, 2002

(65) Prior Publication Data

US 2004/0139234 A1 Jul. 15, 2004

(51) Int. Cl.
*G06F 15/16* (2006.01)
(52) U.S. Cl. .............. 709/253; 709/230; 711/118; 711/131; 711/140; 711/141; 711/146
(58) Field of Classification Search ......... 711/131–146, 711/118; 709/203, 253
See application file for complete search history.

(56) References Cited

U.S. PATENT DOCUMENTS

| | | | | |
|---|---|---|---|---|
| 5,355,467 A | * | 10/1994 | MacWilliams et al. | 711/146 |
| 5,544,342 A | * | 8/1996 | Dean | 711/119 |
| 6,061,766 A | * | 5/2000 | Lynch et al. | 711/146 |
| 6,487,621 B1 | * | 11/2002 | MacLaren | 710/240 |
| 6,615,323 B1 | * | 9/2003 | Petersen et al. | 711/146 |
| 6,725,337 B1 | * | 4/2004 | Tan et al. | 382/220 |
| 6,859,864 B2 | * | 2/2005 | Atanackovic et al. | 257/17 |
| 2006/0155885 A1 | * | 7/2006 | Roos et al. | 710/5 |

OTHER PUBLICATIONS

High-Throughput Coherence controllers by Anthony-Trung Dinh Nguyen, Thesis, University of Illinios at Urbana-Champaign, 2001.*

* cited by examiner

*Primary Examiner*—Nathan J Flynn
*Assistant Examiner*—Mohammad A Siddiqi
(74) *Attorney, Agent, or Firm*—Marger Johnson & McCollom, P.C.

(57) ABSTRACT

A system includes a scalability port switch (SPS) and a plurality of nodes. The SPS has a plurality of ports, each port coupled to a node. Each port is connected to a scalability port protocol distributed (SPPD). A snoop filter in the SPS tracks which nodes may be using various memory addresses. A scalability port protocol central (SPPC) is responsible for processing messages to support coherent and non-coherent transactions in the system.

30 Claims, 11 Drawing Sheets

PROGRAMMABLE PROTOCOL TO SUPPORT COHERENT AND NON-COHERENT TRANSACTIONS IN A MULTINODE SYSTEM

FIELD OF THE INVENTION

This invention pertains to multiprocessor systems, and more particularly to transactions between processors in a multiprocessor system.

BACKGROUND OF THE INVENTION

"Multiprocessing" refers to a computing system including multiple processors. By having more than one processor in the computing system, the system is capable of working more quickly than a comparable single processor system, whether the processors in the multiprocessor system are working collectively on a single program or each executing a different program. A node connects the processors to each other and to memory. The node also tracks which processors have accessed which addresses in the memory, so that conflicts are avoided.

But as the number of processors increases, the complexity of managing the processors increases exponentially. And since the node is a common bus for all of the processors, as the number of processors connected to each node increases, the traffic on the node increases. Eventually, the traffic reaches a point at which processors are idling, waiting for bus access, which negates the advantage of increasing the number of processors.

Coherent transactions are another problem. A coherent transaction is a transaction that may not be performed without making sure that the transaction does not affect another processor. For example, if data may not be cached anywhere, then transactions that read memory values are non-coherent. But if data may be cached, before a processor may read a value from memory, it must make sure that no other processor has cached the memory value (or worse, has modified the data value but not yet written the value back to memory). Systems that mandate that all transactions be non-coherent are simpler in design, but less efficient. But designing a system that allows for coherent transactions is more complicated. And making transactions coherent is even more difficult where the processors do not all communicate with each other across a shared bus.

A need remains for a way to scale the number of processors in a multiprocessor system that addresses these and other problems associated with the prior art.

DETAILED DESCRIPTION OF THE PREFERRED EMBODIMENT

Figure 1:
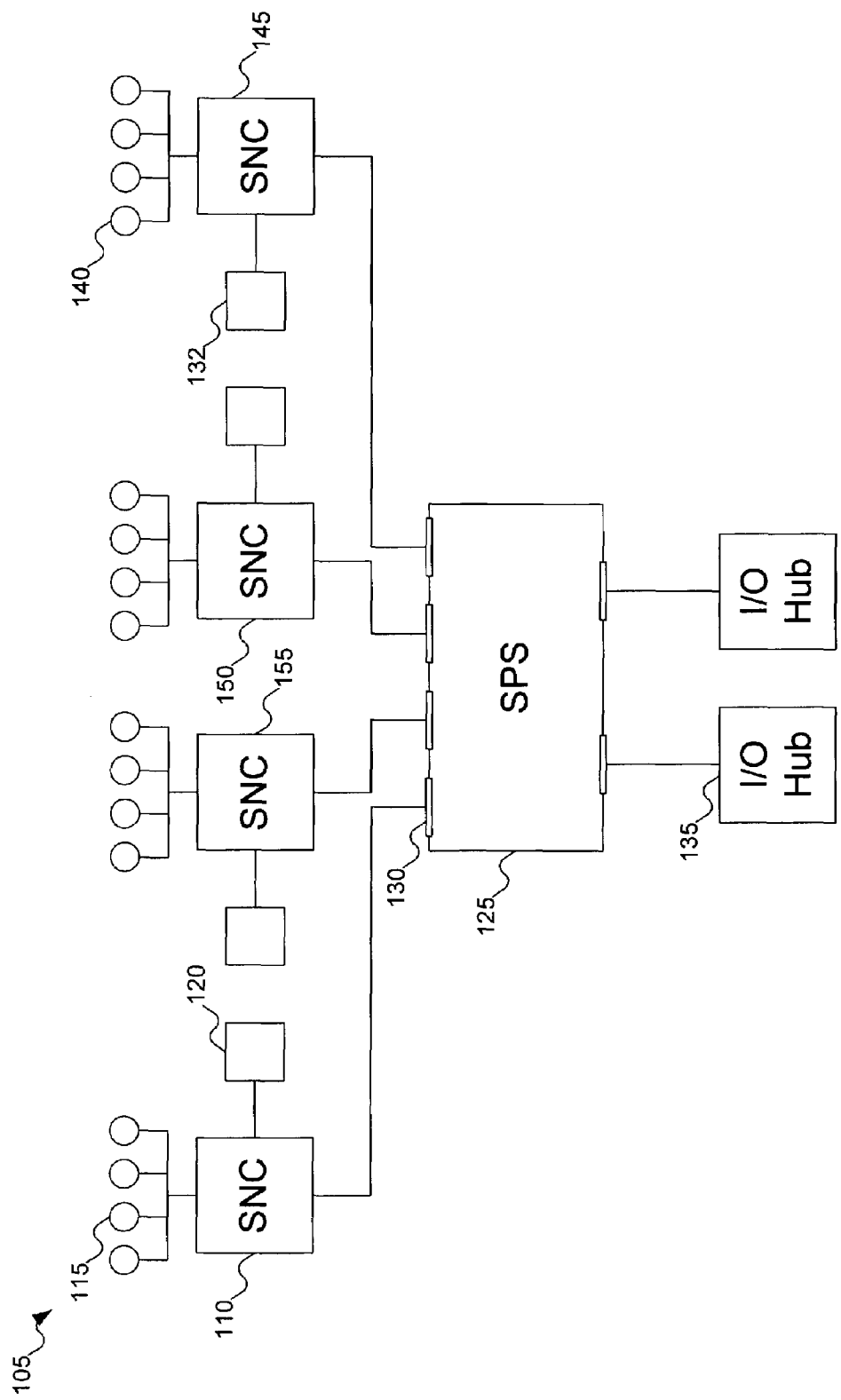
FIG. 1 shows a system including a scalability port switch, according to an embodiment of the invention.

FIG. 1 shows a system including a scalability port switch, according to an embodiment of the invention. In FIG. 1, system 105 is shown. System 105 includes scalable node controllers (SNCs), such as SNC 110. Although this document describes SNC 110 as a scalable node controller, a person skilled in the art will recognize that scalable node controllers are a variety of node controllers in general and that other node controllers may be substituted for SNC 110. SNC 110 is a bus connecting multiple processors, such as processor 115, and memory 120. Processor 115 may be any processor capable of operating in a multiprocessor environment. For example, processor 115 may be an Intel Pentium® 4- or Itanium-class processor or Xeon™ processor, among others. Similarly, memory 120 may be any type of memory, although typically memory 120 is some variety of Random Access Memory (RAM), such as Static RAM (SRAM). Dynamic RAM (DRAM), Extended Data-Out Dynamic RAM (EDO DRAM), Synchronous Dynamic RAM (SDRAM), Rambus Dynamic RAM (RDRAM), and FlashRAM. In addition, memory 120 may be volatile (meaning that the values stored in memory 120 are lost when memory 120 loses power) or non-volatile (meaning that the values stored in memory 120 are retained even if memory 120 loses power).

FIG. 1 shows processors grouped together. Each group of processors is connected to a single SNC. In FIG. 1, each SNC has its own memory, to which processors connected to that SNC have direct access. But a person skilled in the art will recognize that memory may be distributed in any manner desired. For example, all memory may be distributed across a subset of the SNCs, or connected to a single SNC.

To enable the processors to work together, each SNC is coupled to scalability port switch (SPS) 125. Although this document describes SPS 125 as a scalability port switch, a person skilled in the art will recognize that scalability port switches are a variety of port switches in general, and that other port switches may be substituted for SPS 125. SPS 125 has ports, such as port 130, to which various nodes may be coupled. Using SPS 125, the nodes coupled to the ports may communicate with each other. For example, processor 115 may access memory 132, which is connected to a different SNC, via SPS 125.

Although SNCs are nodes, they are not the only type of nodes possible. For example, input/output (I/O) hub 135 is shown coupled to a different port on SPS 125. In addition, although FIG. 1 shows SPS 125 with six ports (and thus capable of supporting up to six nodes), a person skilled in the art will recognize that the number of nodes may vary from six, as desired.

Finally, a few definitions need to be provided. In referring to memory addresses, a home node is the SNC that is connected to the physical memory module storing the memory address. A source node is a node other than the home node that is requesting access of some sort to the memory address. And a remote node is a node other than a home node or a source node. For example, in FIG. 1, assume that processor 140 requests to read a memory value stored in memory 120. SNC 110 is the home node, as it is connected to the physical memory storing the memory address. SNC 145 is the source node, as processor 140 is connected to SNC 140. And SNCs 150 and 155 are remote nodes. The significance of this terminology will become clearer in the example presented below with reference to FIG. 2.

Figure 2:
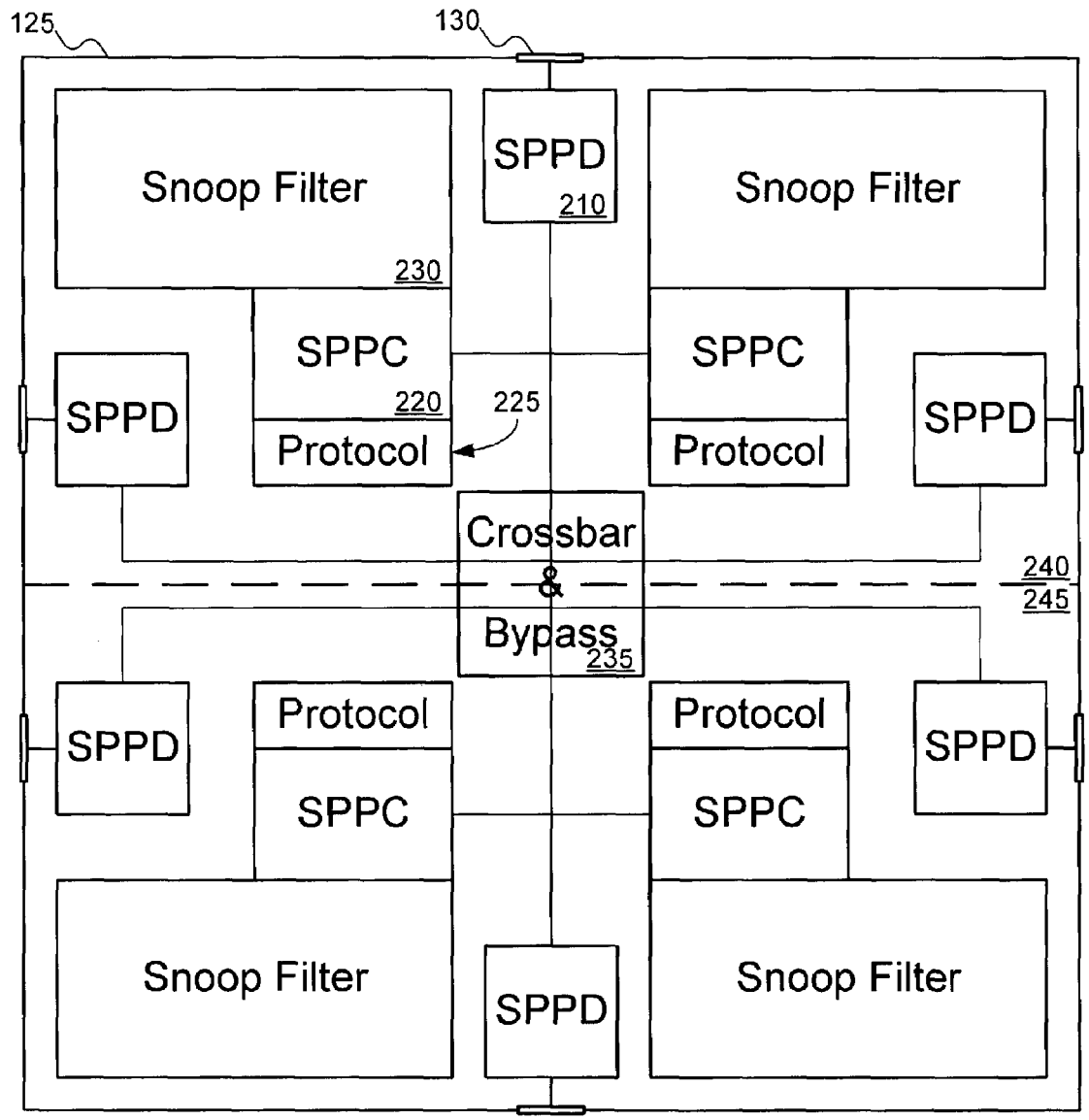
FIG. 2 shows the scalability port switch of FIG. 1, according to an embodiment of the invention.

FIG. 2 shows the SPS of FIG. 1, according to an embodiment of the invention. Connected to port 130 of SPS 125 is scalability port protocol distributed (SPPD) 210. SPPD 210 is responsible for managing message traffic (requests and responses) between port 130 and other parts of SPS 125. SPPD 210 is a variety of distributed protocol logic, and a person skilled in the art will recognize that other distributed protocol logics can substitute for SPPD 210. In a similar manner, the other SPPDs each support a port of SPS 125. The operation of SPPD 210 is discussed further below with reference to FIGS. 4 and 8.

SPS 125 also includes scalability port protocol central (SPPC) 220. SPPC 220 is responsible for handling messages that involve communicating with more than one port 130 of SPS 125. SPPC 220 is a variety of central protocol logic, and a person skilled in the art will recognize that other central protocol logics can substitute for SPPC 220. SPPC 220 is discussed further below with reference to FIGS. 3 and 6A-6C.

SPPC 220 includes protocol 225. Protocol 225 controls the operation of SPPC 220, and is discussed below with reference to FIGS. 3, 5, and 7A-7B.

Snoop filter 230 identifies which ports may be using a particular memory address. Specifically, as nodes on the various ports read values from the memories attached to the various nodes, snoop filter 230 tracks which nodes are using which addresses. Snoop filter 230 does not track which processor in particular is using a particular memory address: the nodes themselves (e.g., the SNC), are responsible for tracking which processors are specifically using the memory addresses. Thus, snoop filter 230 provides pointers to which nodes need to be checked as possibly using the memory address. In one embodiment, snoop filter 230 stores a bit vector associated with memory addresses. If a bit in the bit vector is set, then the most current information available to snoop filter 230 indicates that the corresponding node is using the memory address (that is, at the very least, the corresponding node has read the memory address). But a person skilled in the art will recognize other ways in which snoop filter 230 may identify nodes using the memory address.

In one embodiment, a given memory address may be in one of four possible states: invalid, shared, exclusive, and modified. Invalid state means that no node is currently using the memory address. Shared state means that at least one node is currently using the memory address (and possibly more than one node). Exclusive state means that exactly one node is using the memory address. And modified state means that, not only is exactly one node using the memory address, that node has changed the value of the memory address and has not written the new value to memory. Because the difference in handling memory in modified and exclusive states is minor, and because it is difficult to distinguish between exclusive state and modified state without querying the processor using the memory address, the modified state is typically treated as an exclusive state, thereby simplifying implementation. Thus, snoop filter 230 may return one of three states for a given memory address. The operation of the snoop filter is described further below with reference to FIG. 4 in an example of the operation of SPPC 220.

Crossbar and bypass 235 connects the various SPPDs. For example, if SPPD 210 receives a message from port 130 and needs to route the message to another SPPD (for communication to the node coupled to the port monitored by that SPPD), SPPD 210 uses crossbar and bypass 235 to transmit the message to the other SPPD.

FIG. 2 shows SPS 125 with four each of SPPC 220, protocol 225, and snoop filter 230. A person skilled in the art will recognize that there may be any number of SPPCs 220 and their associated protocols 225, and similarly there may be any number of snoop filters 230. Furthermore, snoop filters 230 do not have to be matched in number with SPPCs 220 and protocols 225. For example, there could be eight SPPCs 220 and protocols 225, but only one snoop filter 230.

An advantage of the configuration shown in FIG. 2 (that is, four each of SPPC 220, protocol 225, and snoop filter 230) is that message processing may be divided among the four SPPCs 220. For example, suppose a node generates a message that involves a memory address. The lowest two bits of the memory address may be used to select one of the four SPPCs 220 to process the message.

FIG. 2 also shows SPS 125 divided into two domains 240 and 245. Although typically the same protocol is used as protocol 225 associated with each SPPC 220, the protocols may be different in different domains. In addition, a person skilled in the art will recognize that domains are not required, and that there may be more than two domains.

Figure 3:
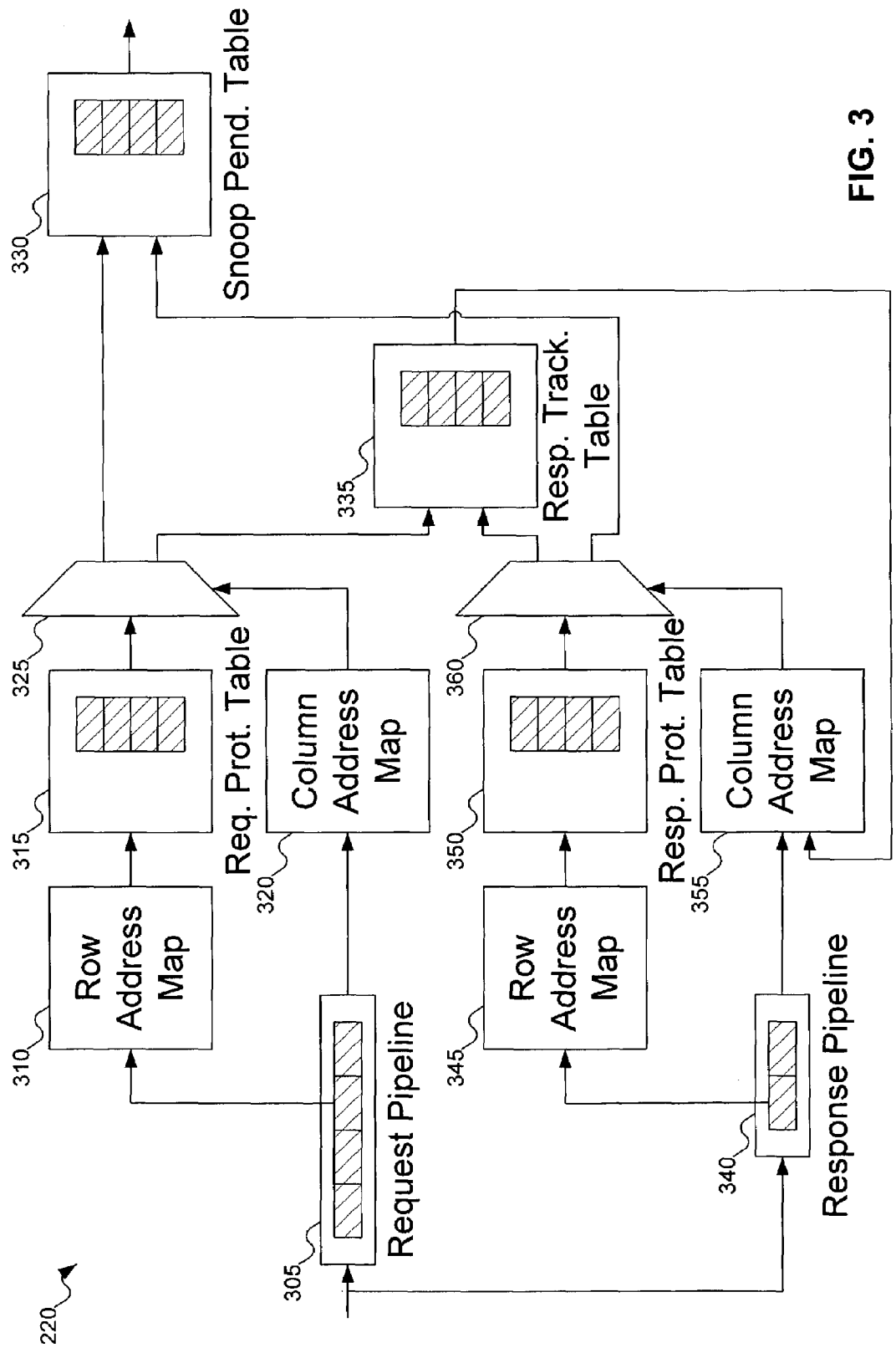
FIG. 3 shows the scalability port protocol central in the scalability port switch of FIG. 2, according to an embodiment of the invention.

FIG. 3 shows the scalability port protocol central in the SPS of FIG. 2, according to an embodiment of the invention. As mentioned above with reference to FIG. 1, SPPC 220 is responsible for processing messages that involve communicating with more than one SPPD. In FIG. 3, messages arrive from the left. Based on a type of the message, the message is placed in either request pipeline 305 or response pipeline 340. Request and response messages are processed differently, and so will be described individually.

Request pipeline 305 is shown as a four-stage pipeline. The specifics of what happens at each stage of request pipeline 305 is not pertinent, and request pipeline 305 could have any number of stages. At some point when the message is in request pipeline 305, the type of request is determined. For example, the message could be a request to read a value from a memory address, or it could be a request to lock the system (and let the requesting processor have sole control of the system). A person skilled in the art will recognize other types of request that may be made. Similarly, at some point, the snoop filter (shown earlier in FIG. 2) is queried to determine the state of a memory address included in the request.

Finally, if the message involves reading a value from memory, at some point a speculative read request is made of the memory address. The speculative read request is sent to the node to which the physical memory module storing the memory address is located. If a speculative read is performed, the node reads the memory address. Once the node receives a confirmation that the read is no longer speculative, the response is sent directly to the node requesting the value of the memory address. That is, the message is sent directly to the SPPD connected to the port to which the node is coupled, via the crossbar and bypass. The response to the speculative read request does not return to SPPC 220.

The type of request is used by row address map 310 to identify how the state machine in the SPPC is to be updated. Row address map 310 maps request message types to rows in request protocol table 315. Request protocol table 315 is a table of rows, indicating how different types of requests are processed by SPPC 220. In effect, the system is a large finite state machine, with request protocol table 315 indicating at least in part what the states of the finite state machine are and how the finite state machine changes based on different combinations of states and inputs. A single row in request protocol table 315 specifies the possible valid states the finite state machine may be in when the message arrives, the states the finite state machine may move to, how those transitions are made, and any messages (that is, inputs and outputs to the finite state machine) needed to accomplish those transitions. Each row in request protocol table 315 is divided into columns, each column indicating how the finite state machine is to behave given a possible starting state of the finite state machine. (The starting state is determined by the snoop filter, as described below.) A detailed example is also provided below.

As the request message leaves request pipeline 305, the snoop filter responds to the query about the memory address in the request. Specifically, the snoop filter responds with the state of the memory address (invalid, shared, or exclusive). The snoop filter state is used by column address map 320 to determine which column from the speculatively read row of request protocol table 315 is to be processed. The row of request protocol table 315 and the column identified by column address map 320 are passed to multiplexer 325, which determines the next process to be performed by SPPC 220.

After the row and column of request protocol table 315 are determined, this information is forwarded to two tables: snoop pending table 330 and response tracking table 335. Snoop pending table 330 is responsible for sending any messages as indicated by the identified row and column of request protocol table 315. This includes, for example, snoop messages sent to remote nodes, or a response message sent to the request originator. Response tracking table 335 is responsible for tracking any snoop messages sent by snoop pending table 330, to ensure that responses are received and correctly processed. The operation of response tracking table 335 will become clearer in the example message described below.

When a response message is received (such as a response to a snoop message sent by snoop pending table 330), the response is placed in response pipeline 340. In a manner similar to that explained earlier with regard to request messages, row address map 345 determines the appropriate row to read from response protocol table 350, based on the response type. Column address map 355 determines the appropriate column of the speculatively read row. Note that, unlike the situation with request messages, there is no waiting for an inquiry to the snoop filter to determine the appropriate column: such information is already known by the fact that the message is a response. Multiplexer 360 takes the row of response protocol table 350 and the indicated column from column address map 355, and determines how to update snoop pending table 330 and response tracking table 335.

Once response tracking table 335 receives the response message, it updates its internal state to reflect the received message. Note the feedback connection between response tracking table 335 and column address map 355. This feedback connection shows that as response tracking table 335 is updated, it may affect how received responses are later processed. For example, when response tracking table 335 has tracked the receipt of all but one snoop messages sent by snoop pending table 330, response tracking table 335 may use column address map 355 to indicate that the next response message to be received will be the last relating to the current transaction. Snoop pending table 330 will then have all the necessary information to respond to the request message received earlier.

As an example of how SPPC 220 processes request messages, consider the following situation, Referring back to FIG. 1, assume that processor 140 wants to read a value from memory 120 . (Recall that in this situation, SNC 110 is termed the home node, SNC 145 is the source node, and SNCs 150 and 155 are remote nodes.) To perform the read, processor 140 informs SNC 145 of the desire to read the memory address. SNC 145 sends a request message, with a request type indicating a memory read request. Because the message is a request message the message is queued in request queue 305. At some point, SPPC 220 sends a snoop request to the appropriate snoop filter, inquiring about which nodes may be using the memory address in question. Similarly, a speculative read request is sent to the home node. Row address map 310 uses the request message type (in this case, a memory read request) to identify the appropriate row in request protocol table 315 to access. The row in request protocol table 315 might represent data such as that shown in Table 1. (Table 1 is a portion of Table A-4 from Appendix A, which shows an embodiment of request protocol table 315 and response protocol table 350.)

TABLE 1

| Snoop Filter State | New Snoop Filter State | Memory Read State | Response Tracking Table State | Outgoing Snoop Pending Table Message | | |
|---|---|---|---|---|---|---|
| | | | | To Home Node | To Remote Node | To Source Node |
| Invalid | Shared | No | UPDATE | Memory Read | | Snoop Invalid |
| Shared | Shared | No | UPDATE | Memory Read | | Snoop Shared |
| Exclusive at Source | Exclusive | No | UPDATE | Memory Read | | Snoop Invalid |
| Exclusive at Home | Pending Shared | No | RESPONSE_PENDING | Read Line | | |
| Exclusive not at Home, other than Source | Pending Shared | Yes | RESPONSE_PENDING | | Snoop Line | |

To read Table 1, the first column represents the current state of the snoop filter (that is, the state returned by the snoop message sent while the message is still in request pipeline 305). As such, each "row" of Table 1 is a "column" from request protocol table 315. For example, the second "row" of Table 1 represents the "column" of request protocol table 315 where the message is a read request and the snoop filter indicates that the memory address is in an invalid state.

Considering each "column" of Table 1 in turn, the operation of SPPC 220 responsive to the memory read request message may be understood as follows. If the snoop message returns an invalid state, then no node was previously using the memory address. As noted earlier, a speculative read request message was issued to the home node, which corresponds to the Memory Read message shown in "column" 1. This means that no further read is required of memory (the column of Table 1 marked Memory Read State). The Response Tracking Table is put in Update state, meaning SPPC 220 has completely processed all messages. The snoop filter is updated to mark the memory address as being shared (although in practice, the memory address may be marked as being used exclusively by the node: whether shared or exclusive state is used in this situation is implementation-dependent). Finally, SPPC 220 sends a snoop invalid message to the source node, letting the source node know that the value returned from the speculative read is current, and the read request message is fully processed.

If the snoop message returns a shared state, then at least one node was previously using the memory address. If the memory address is in a shared state, then there is no concern about one of the nodes using the memory address having a more current value, so no further read of the memory address is required. The Response Tracking Table is put in Update state. The snoop filter is updated to indicate that the source node is also sharing the memory address. Finally, SPPC 220 sends a snoop shared message to the source node, letting the source node that it is sharing the memory address.

If the snoop message indicates that the source node is an exclusive user of the memory address, then the current value of the memory address is already known at the source node (albeit, perhaps in a different processor on the node: intra-node communication is a separate issue not addressed in this document). No further read of the memory address is required. The Response Tracking Table is put in Update state. No update of the snoop filter is necessary, since the node still has exclusive access to the memory address. SPPC 220 sends the source a snoop invalid message, letting the node know that no other node is using the memory address.

If the snoop message indicates that the home node is the exclusive user of the memory address, things become a little more complicated. SPPC 220 is put in a Pending Shared state, as there may be now two nodes sharing access to the memory address. The Response Tracking Table is put in a Response Pending state, indicating that SPPC 220 is waiting for a message (in this case, from the home node). Since the home node may have an updated value for the memory address but not yet written the new value to memory, SPPC 220 needs to wait for the home node to indicate that the source node may proceed. SPPC 220 sends the home node a Read Line message to the home node, and waits for home node to respond.

Finally, if the snoop message indicates that a remote node is the exclusive user of the memory address, SPPC 220 is put in a Pending Shared state. The Response Tracking Table is put in a Response Pending state, indicating that SPPC 220 is waiting for a message (in this case, from the remote node indicating it has written back to the memory address in the source node any update to the value in the memory address). SPPC 220 sends the remote node a Snoop Line message, alerting the remote node that it needs to write back to the memory address any update to the value.

As an example of how SPPC 220 processes response messages, consider the following situation. Assume that SPPC 220 has sent a snoop message to at least one node. SPPC 220 then gets back a snoop message from the snooped nodes, indicating that for that snooped node, the memory address is invalid (that is, the snooped node is not using the memory address). SPPC 220 may transition to a new state in one of the following ways:

If SPPC 220 had previously been in a shared state, then SPPC 220 may not be sure of its new state. If every node using the memory address has finished with the memory address, then the memory address would be in an invalid state. But if the memory address is being used by at least one node, then SPPC 220 would be in either shared or exclusive state. To simplify processing the memory address is treated as shared, even though it might be that no node is using the memory address. The snoop filter, though, is updated to reflect the fact that the snooped node indicated it is no longer using the memory address. Assuming SPPC 220 is not waiting for any further messages, SPPC 220 might send a memory read message to the home node, if the state of SPPC 220 indicates that a memory read is to be performed. Further, a snoop invalid message may be sent to the source node, letting the source node know that it may continue.

If the SPPC 220 had previously been in an exclusive state, then upon receipt of the snoop invalid response message, SPPC 220 knows that no node is currently using the memory address. The snoop filter may be updated to reflect the snoop invalid message from the snooped node. If necessary, a memory read message may be sent to the home node, and a snoop invalid message may be sent to the source node.

As should now be apparent, SPPC 220 enables coherent transactions to be performed in a system where processors do not all share a common bus, and where memory is distributed across multiple nodes. But there are still non-coherent transactions. For example, a processor may request that the system be locked, in effect blocking all other nodes until the requesting node unlocks the system. To lock the system, the requesting node sends a lock request message to SPPC 220. SPPC 220 then sends lock messages to the other nodes, and waits for the nodes to respond, indicating that they have stopped processing. Once SPPC 220 has received responses from all nodes, SPPC 220 may respond to the node requesting the lock, informing the node that the system is locked.

Unlocking the system is similarly a non-coherent transaction. The node that has locked the system sends an unlock request message to SPPC 220. SPPC 220 informs all of the other nodes that the system is unlocked, and waits for each node to acknowledge the unlock message. Once all the nodes have responded, SPPC 220 responds to the node requesting the unlock, informing the node that the system is unlocked.

Figure 4:
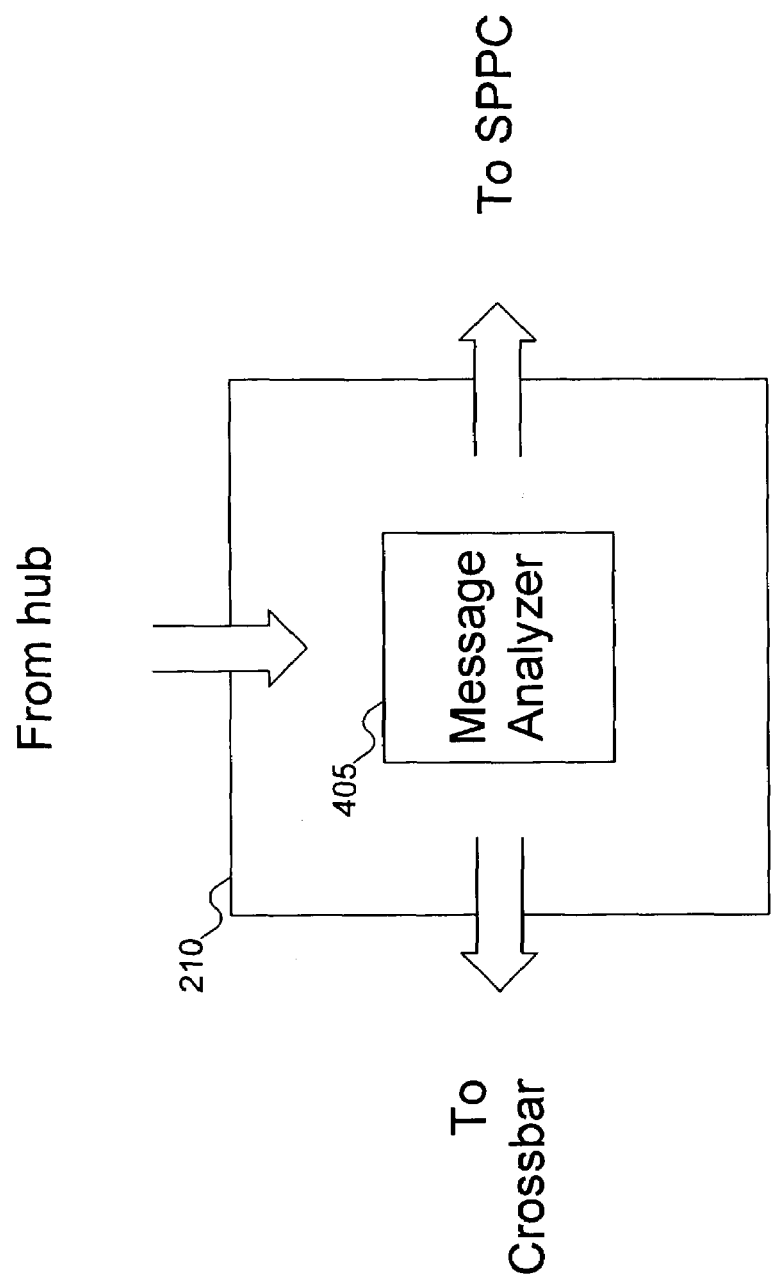
FIG. 4 shows the scalability port protocol distributed in the scalability port switch of FIG. 2, according to an embodiment of the invention.

FIG. 4 shows the scalability port protocol distributed in the SPS of FIG. 2, according to an embodiment of the invention. In FIG. 4, SPPD 210 includes message analyzer 405. Message analyzer 405 analyzes messages received from the node. By analyzing the message, message analyzer may determine how many nodes might be involved in the processing the transaction embodied in the message. If the transaction may be completed by communicating with only one other node, then the message is routed to the appropriate node via the crossbar and bypass and the SPPD monitoring the node. (An example of such a message is a message writing a value to the memory of the other node.) But if processing the transaction might involve more than one node (e.g., a request to read a memory address), SPPD 210 routes the message to an appropriate SPPC.

Figure 5:
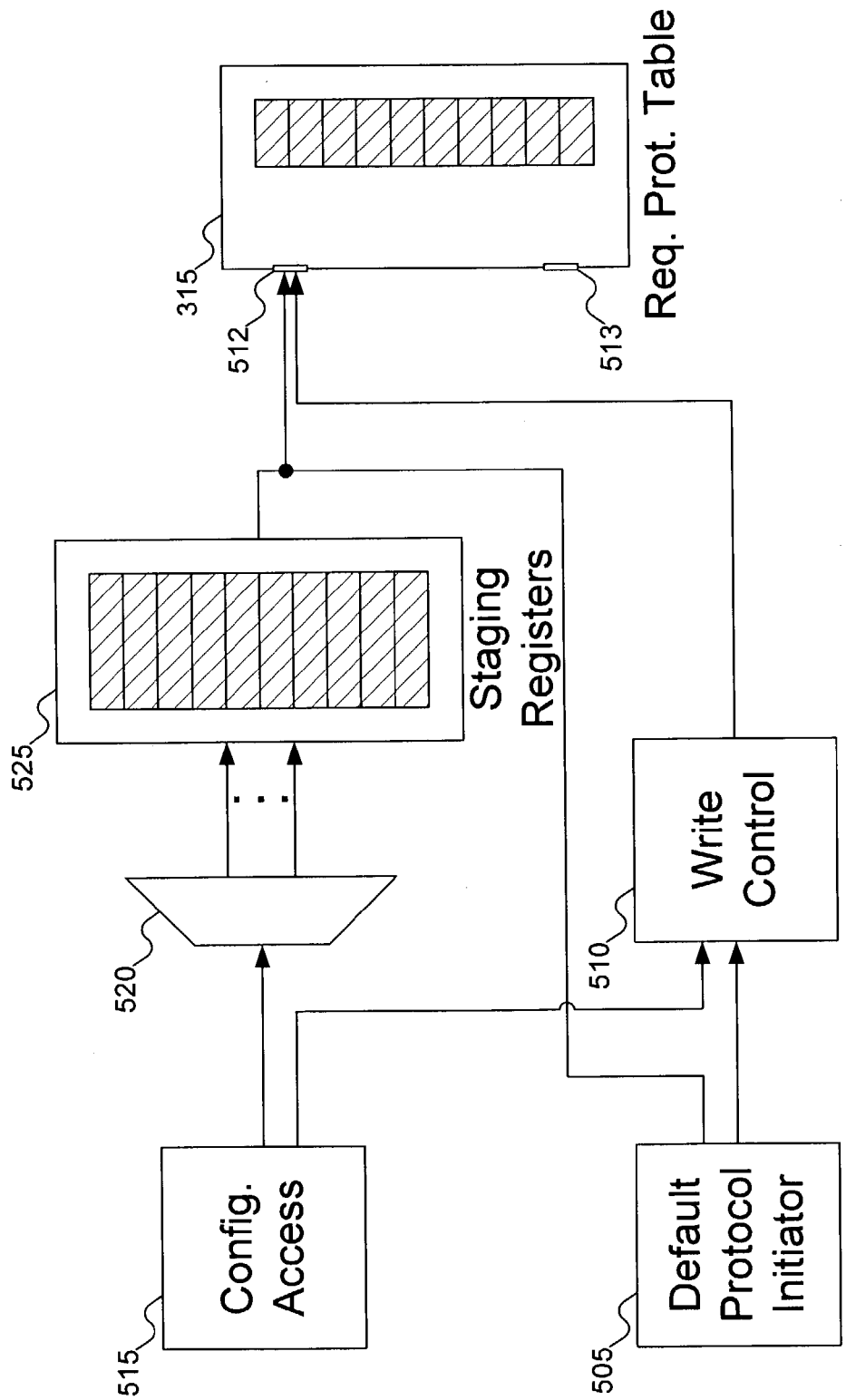
FIG. 5 shows how the protocol tables of the scalability port protocol central of FIG. 3 may be programmed or reprogrammed, according to an embodiment of the invention.

One advantage of the SPPC as shown in FIG. 2 is that the request protocol and response protocol tables may be programmed. This has two implications. First, the protocol tables do not need to be hard coded with the state machine information, but rather may load default protocols. Thus, the protocol tables may use volatile memory: if power fails (and the protocol tables are cleared), the tables may be reloaded with default values. Second, as experience teaches whether various protocols in the protocol tables work, the protocols may be reprogrammed. FIG. 5 shows how the protocol tables of the SPPC of FIG. 3 may be programmed or reprogrammed, according to an embodiment of the invention. Although FIG. 5 shows how request protocol table 315 may be programmed, a person skilled in the art will recognize how the same technique may be used to program the response protocol table.

Default protocol initiator 505 is typically a read-only memory (ROM) module that stores the default protocols. But a person skilled in the art will recognize other forms default protocol initiator 505 may take: for example, a non-volatile random access memory (RAM) or a flash RAM. Default protocol initiator 505 is connected to write control 510 and to port 512 of request protocol table 315. Write control 510 is responsible for sending a signal to port 512 of request protocol table 315, indicating that data are incoming on port 512 to be written to a row of request protocol table 315. The signal from write control 510 also specifies the row to be written, and the data come directly from default protocol initiator 505. (In comparison to port 512, port 513 of request protocol table 315 is used when reading a row from request protocol table 315, as described above with reference to FIG. 3.)

The above paragraph describes how request protocol table 315 may be programmed initially with the default protocol. When a particular row is to be reprogrammed, configuration access 515 is used. Data are received from the user through configuration access 515. As the new programming data are fed to demultiplexer 520, the data are stored in staging registers 525. Staging registers 525 are used because the amount of data to be programmed is typically too large to be received at one time, so the data are received in pieces, and stored in staging registers 525 until all the data have arrived. Then, configuration access 515 sends a signal to write control 510, which signals request protocol table 315 to write the data, delivered from staging registers 525 to port 512 of request protocol table 315, into a particular row. As with default protocol initiator 505, when write control 510 is used to write a new programming row into request protocol table 315, the signal from write control 510 indicates the row to be reprogrammed.

As mentioned earlier with reference to FIG. 3, the protocol table (either the request protocol table or the response protocol table) is accessed in one of the stages of the pipeline (the request pipeline or the response pipeline, respectively). As the protocol table is programmable, it is not hard-coded. But because the protocol table is accessed before the message has left the pipeline, there is no performance hit associated with accessing the protocol table.

Figure 6A:
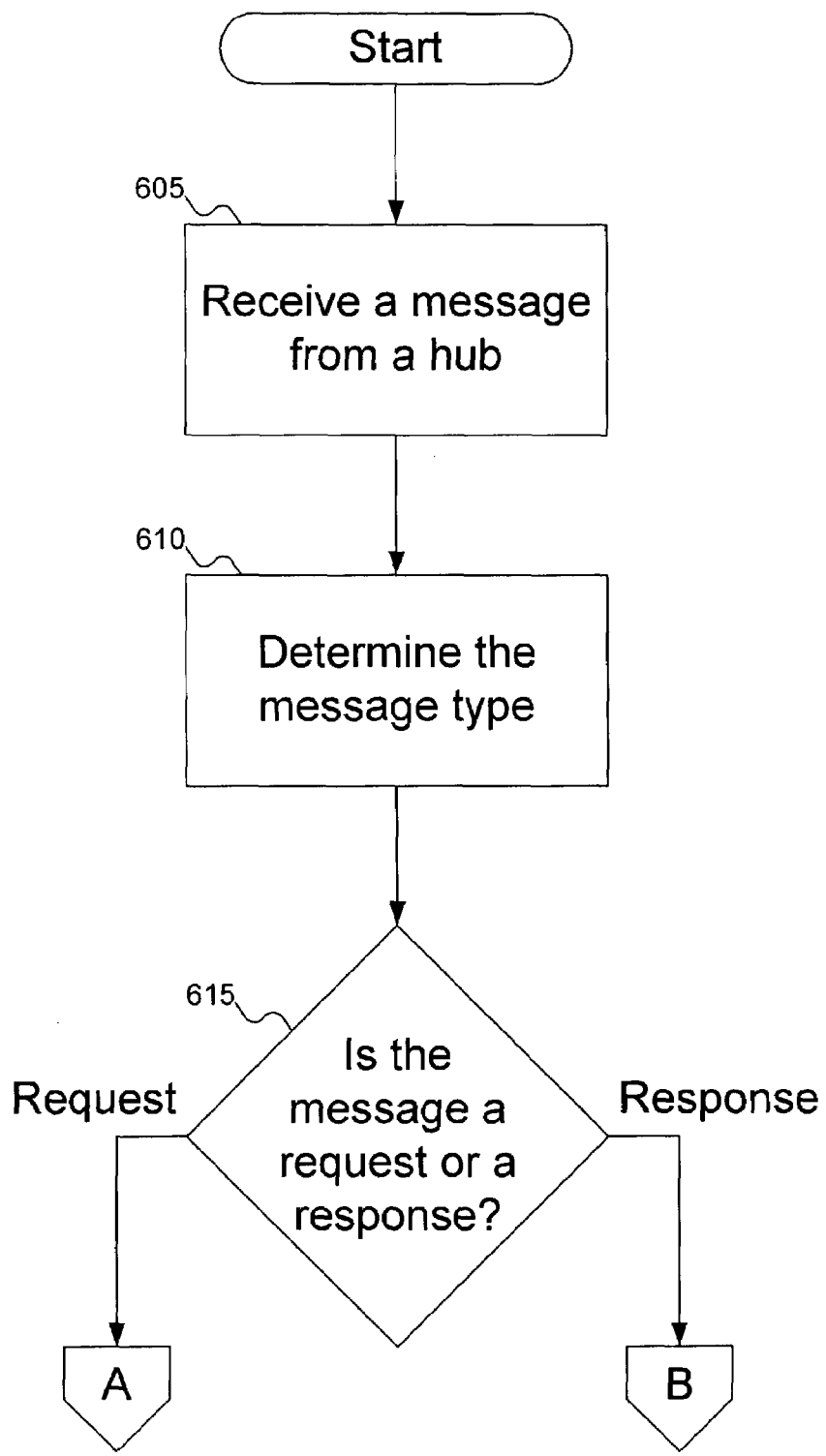
FIGS. 6A-6C show a flowchart of the procedure for processing a message by the scalability port protocol central of FIG. 3, according to an embodiment of the invention.
Figure 6B:
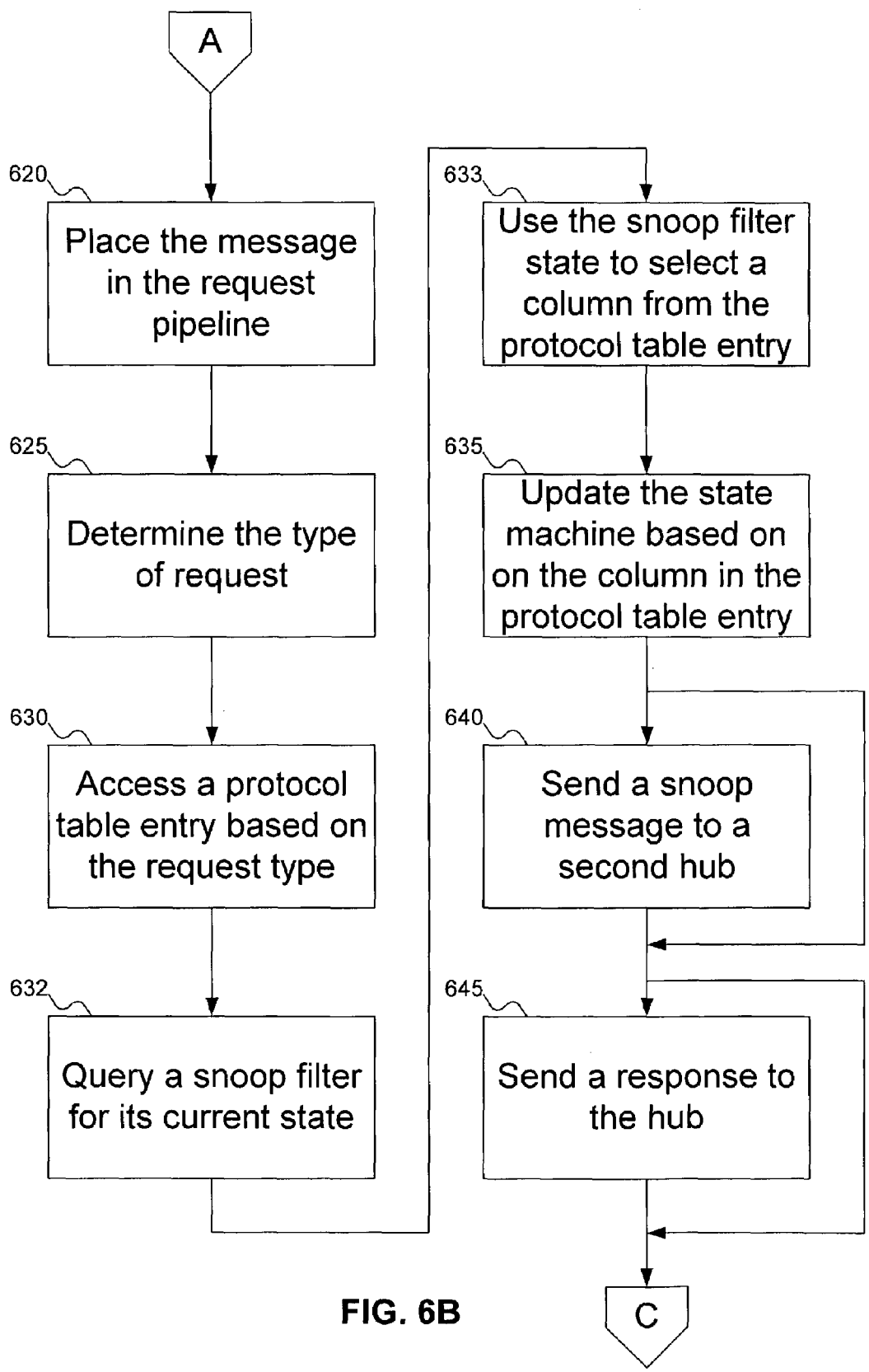
Figure 6C:
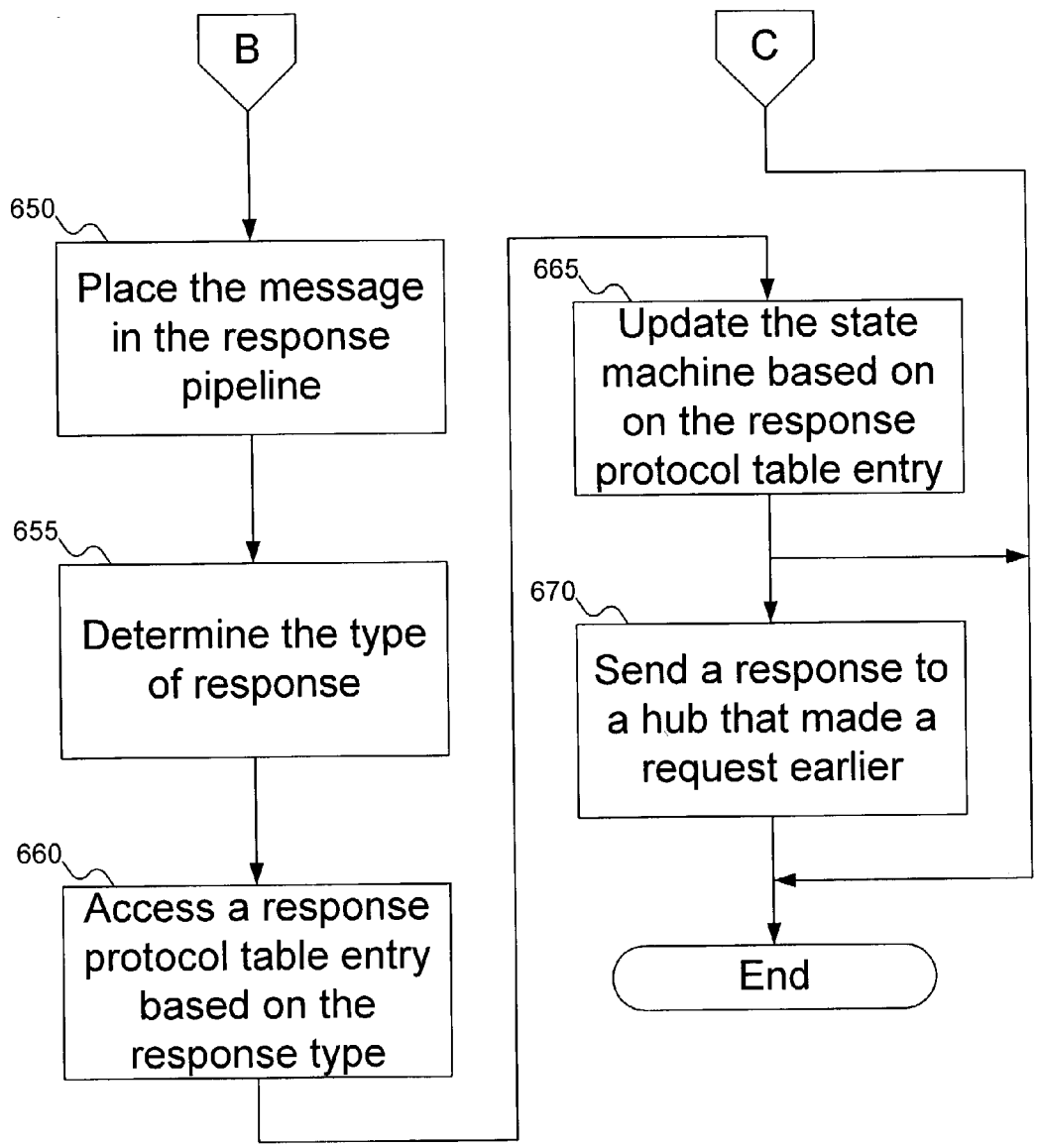

FIGS. 6A-6C show a flowchart of the procedure for processing a message by the SPPC of FIG. 3, according to an embodiment of the invention. In FIG. 6A, at block 605, the SPPC receives a message from a node (via an SPPD). At block 610, the SPPC determines the message type (request or response). At block 615, the SPPC uses the message type to process the message. If the message is a request, then processing continues at block 620 on FIG. 6B. If the message is a response, then processing continues at block 650 on FIG. 6C.

If the message is a request, then in block 620 (FIG. 6B) the message is queued in the request pipeline. At block 625, the SPPC determines the type of request. At block 630, using the request type, the SPPC accesses an entry in the protocol table. At block 632, the SPPC queries a snoop filter for its current state, relative to a memory address in the request message. At block 633, the SPPC uses the snoop filter state to determine the appropriate column from the protocol table entry. At block 635, the SPPC uses the column of the protocol table entry to update the state machine. At block 640, the SPPC sends one or more snoop messages to nodes. Which nodes are snooped depends on which nodes are using the memory address, which information is stored in the snoop filter. Finally, at block 645, a response is sent to the node that made the request.

As shown in FIG. 6B, the SPPC may or may not send the snoop messages. Whether the SPPC sends the snoop messages depends on whether or not any nodes are using the memory address. For example, if no nodes are using the memory address, then no snoop messages need be sent.

As shown in FIG. 6B, the SPPC may or may not respond to the request message. Whether the SPPC responds to the request message depends on whether the SPPC has all the information needed to respond. For example, if the SPPC is waiting for a response to a snoop message, the SPPC may not send a response to the requesting node. Further, in some situations, the response to the request may issue from another node, rather than from the SPPC. In that case, since the SPPC knows that the node will receive a response, the SPPC itself does not respond to the request.

If the message was a response instead of a request, then at block 650 (FIG. 6C), the SPPC queues the message in the response pipeline. At block 655, the SPPC determines the type of response. At block 660, using the response type, the SPPC accesses an entry in the protocol table. At block 665, the SPPC updates the state machine based on the protocol table entry. This involves determining the appropriate column from the protocol table entry. But as the SPPC has already determined the appropriate column (having done so in order to send the snoop message), the SPPC does not have to query the snoop filter for the appropriate state. Finally, at block 670, the SPPC sends a response to a request previously made by a node.

As shown in FIG. 6C, the SPPC may or may not respond to an earlier request. Whether the SPPC responds to an earlier request depends on whether a response is needed. For example, if the SPPC was unable to respond earlier because it needed to snoop a node, then the SPPC may be able to respond after receiving the snoop response from the node.

Figure 7A:
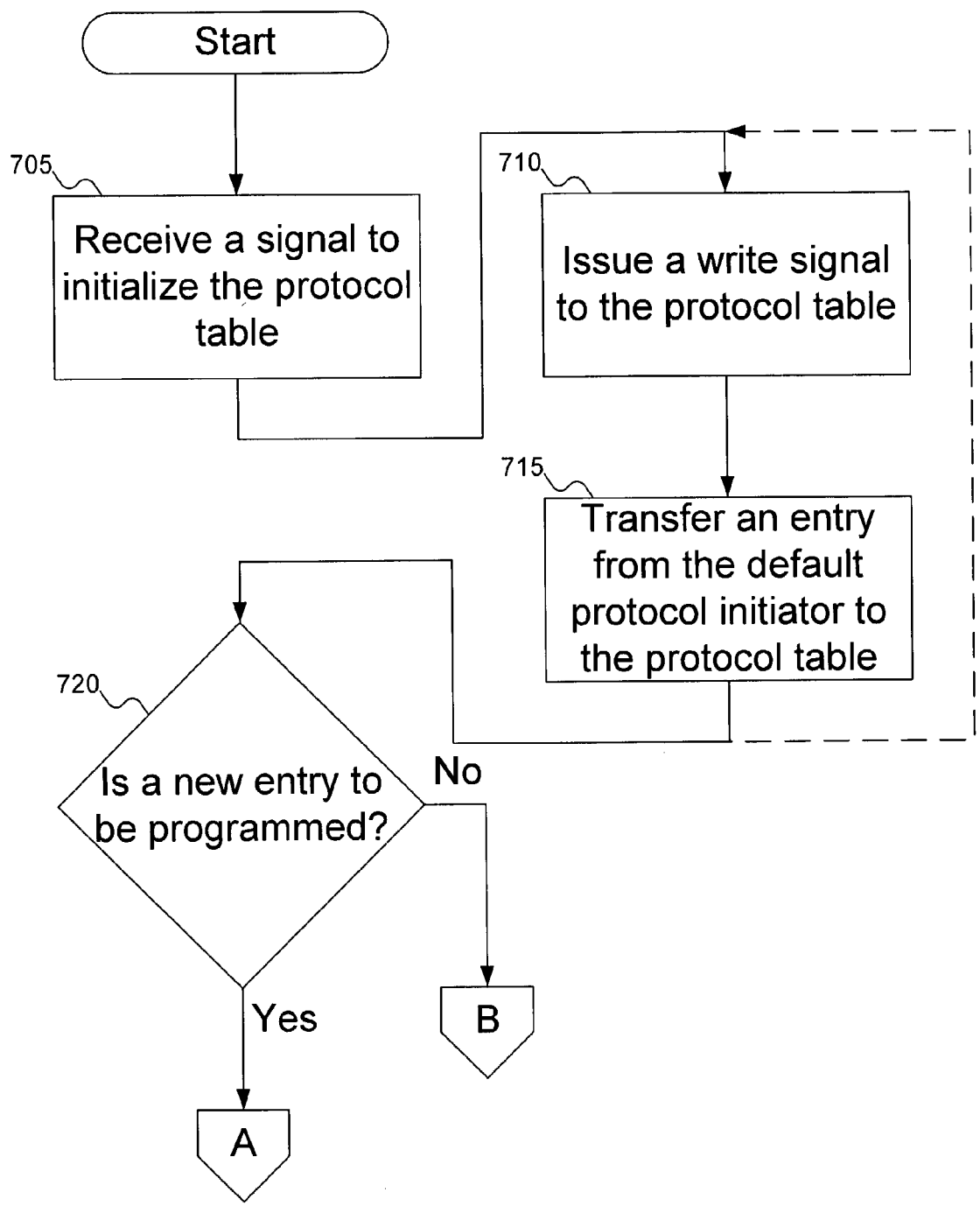
FIGS. 7A-7B show a flowchart of the procedure for programming/re-programming the protocol tables of the scalability port protocol central of FIG. 3, according to an embodiment of the invention.
Figure 7B:
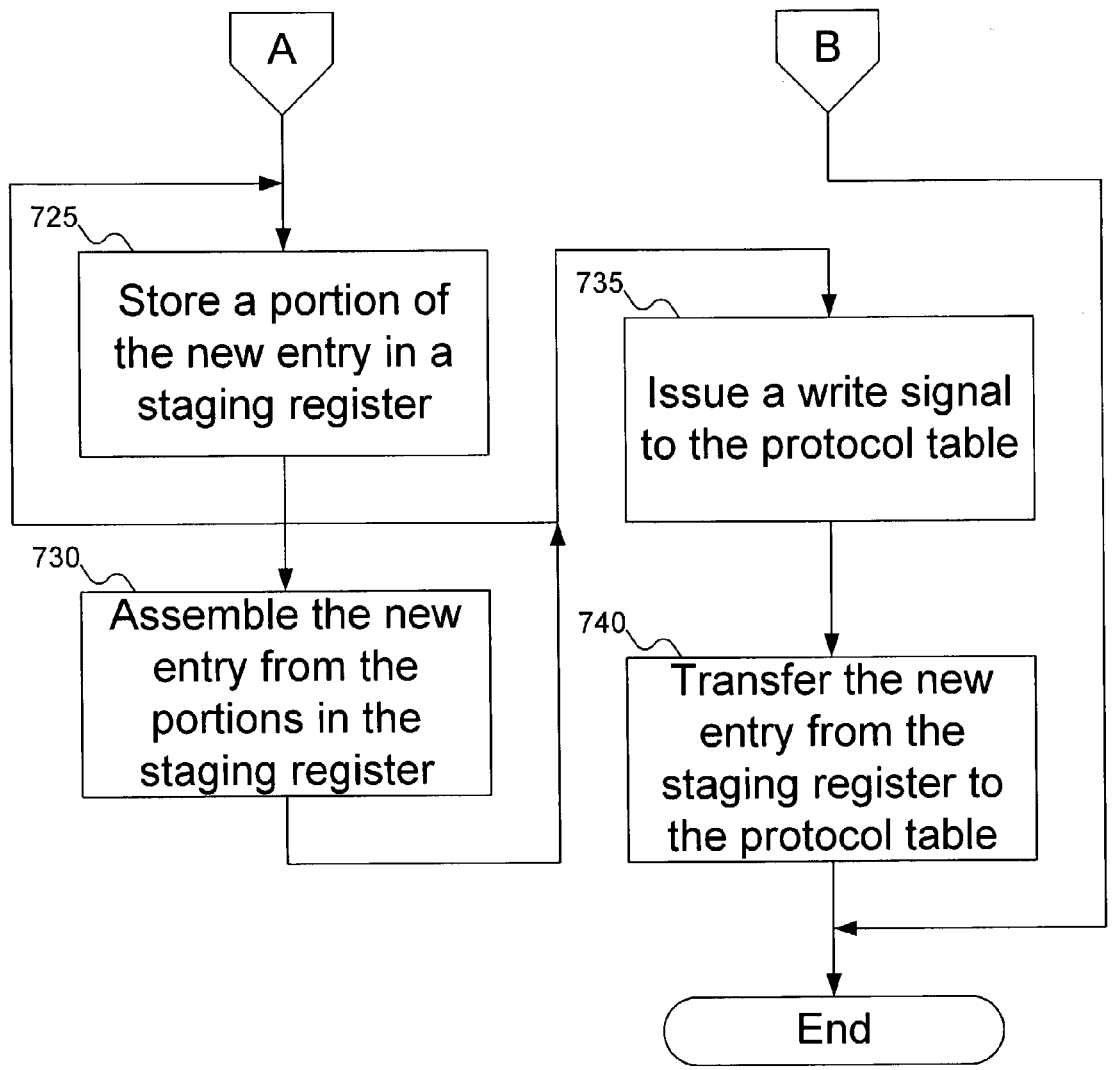

FIGS. 7A-7B show a flowchart of the procedure for programming/re-programming the protocol tables of the SPPC of FIG. 3, according to an embodiment of the invention. In FIG. 7A, at block 705, the SPPC default protocol initiator in the SPPC receives a signal to initialize the protocol table. At block 710, the default protocol initiator sends a write signal to the write control, which sends a write signal to the protocol table. At block 715, an entry is transferred from the default protocol initiator to the protocol table. Blocks 710 and 715 may repeat as needed to initialize more than one row in the protocol table. At block 720, the SPPC determines if a new entry is to be programmed into the protocol table.

If a new entry is to be programmed into the protocol table, then at block 725 (FIG. 7B), a portion of the new entry is stored in a staging register. Block 725 may be repeated as needed until the entire new entry is stored in the staging register. At block 730, the new entry is assembled in the staging registers. At block 735, the write control issues a write signal to the protocol table, including which row in the protocol table is to be written. Finally, at block 740, the new entry is transferred from the staging register to the protocol table.

Figure 8:
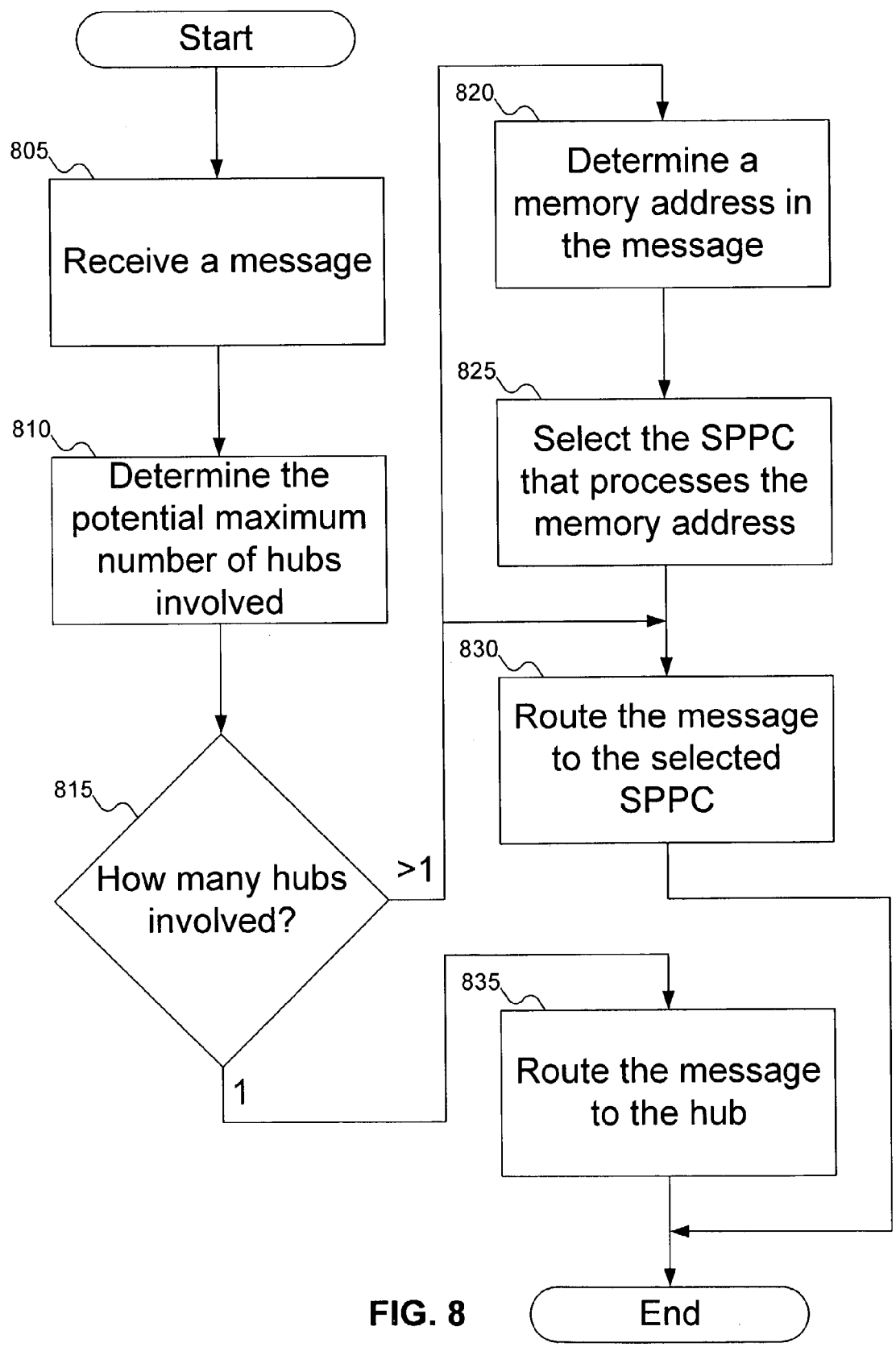
FIG. 8 shows a flowchart of the procedure for routing a message from the scalability port protocol distributed of FIG. 4, according to an embodiment of the invention.

FIG. 8 shows a flowchart of the procedure for routing a message from the SPPD of FIG. 4, according to an embodiment of the invention. In FIG. 8, at block 805, the SPPD receives a message from the node. At block 810, the SPPD determines how many nodes might potentially be involved in responding to the message. At block 815, the SPPD switches based on the number of nodes potentially involved in responding to the message. If more than one node is potentially involved, then at block 820 the SPPD determines a memory address of the message. At block 825, the SPPD determines the SPPC that processes that memory address, and at block 830 the SPPD routes the message to the identified SPPC. Alternatively, if only one node is involved in responding to the message, then at block 835 the SPPD routes the message to the node via the SPPD that handles communications for the node.

A person skilled in the art will recognize that blocks 820 and 825 are only needed when there is more than one SPPC in the SPS. If there is only one SPPC, then processing may continue directly at block 830, with the message being directed to the (lone) SPPC. In addition, although blocks 820 and 825 describe the SPPD as selecting an SPPC based on a memory address in the message, a person skilled in the art will recognize that there are other ways to select an SPPC. For example, SPPCs may be sent messages in a round-robin fashion, or there may be an SPPC assigned to process messages from the SPPD.

A person skilled in the art will recognize that an embodiment of the invention described above may be implemented using a computer or other machine. In that case, the method is embodied as data that comprise a program that cause the machine to carry out the method. The program may be stored on computer- or machine-readable media, such as floppy disks, optical disks (such as compact discs), or fixed disks (such as hard drives), and memory, such as random access memory (RAM), read only memory (ROM), and flash memory. The program may then be executed on a computer to implement the method.

Having illustrated and described the principles of the invention in a preferred embodiment thereof, it should be readily apparent to those skilled in the art that the invention may be modified in arrangement and detail without departing from such principles. All modifications coming within the spirit and scope of the accompanying claims are claimed.

Appendix A

Appendix A includes tables showing an embodiment of the protocol tables described above. Table A-1 describes coherent commands that may be received by the Scalability Port Switch (SPS). Table A-2 describes non-coherent commands and special commands that may be received by the SPS. Table A-3 describes requests issued by the SPS. Table A-4 describes the default settings of the SPS after performing a snoop filter lookup. Table A-5 describes the default settings of the snoop response table.

TABLE A-1

| Scalability Port Request from Source Node | SP Attribute | Description | SPS Responses |
|---|---|---|---|
| PRLD | WB, UC | Port Read Line Data | PSNR[I/S] + PDATA, PSNR[M/MS] + PDATA + PCMP, PRETRY |
| PRLC | WB, UC | Port Read Line Code | |
| PRIL | WB, LCK, WM | Port Read and Invalidate Line | PSNRI + PDATA, PSNRM + PDATA + PCMP, PRETRY |

TABLE A-1-continued

| Scalability Port Request from Source Node | SP Attribute | Description | SPS Responses |
|---|---|---|---|
| PRILO | WB, WM | Port Read and Invalidate Line w/OWN# set | |
| PRC | UC | Port Read Current | PSNR[I/S] + PDATA, PSNR[M/MS] + PDATA + PCMP, PRETRY |
| PMRS | WB, UC | Port Memory Read Speculative | None |
| PRLC, PRLD, PRIL, PRILO with ReqType [2] = 1 | WB, UC | Port Read command as defined above, except an SPS generated speculative read is not necessary. (Already sent previously by node controller) | PSNR[I/S] + PDATA, PSNR[M/MS] + PDATA + PCMP,[1] PRETRY, |
| PSLD | WB | Port Snoop Line Data | PSNR[I/S], PSNR[M/MS] + PDATA + PCMP, PRETRY, |
| PSLC | WB | Port Snoop Line Code | |
| PSIL | WB, WM, LCK | Port Snoop and Invalidate Line | PSNRI, PSNRM + PDATA + PCMP, |
| PSILO | WB, WM | Port Snoop and Invalidate Line w/ OWN# set | PRETRY |
| PIL | WB | Port Invalidate Line | PSNRI, PRETRY |
| PFCL | WB | Port Flush Cache Line | PSNRI, PSNRM + PCMP, PRETRY |
| PSFCL | WB | Port Snoop Flush Cache Line | |
| PILND | WB | Port Invalidate Line No Data | |
| PSILND | WB | Port Snoop and Invalidate | |

TABLE A-1-continued

| Scalability Port Request from Source Node | SP Attribute | Description | SPS Responses |
|---|---|---|---|
| PMWx | WB | Port Memory Write with data- to remote node Line No Data | PCMP, PRETRY |
| | WB | Port Memory Write without data- to local node | PCMP |
| PCLR | WB | Port Cache Line Replacement | None |

Notes:
[1]PRIL and PRILO do not get PSNRS or PSNRMS.

TABLE A-2

| Request | Description | Broadcast | SPS Responses |
|---|---|---|---|
| PRNC | NC Port Memory Read | N | PCMP_D, PRETRY |
| PWNC | NC Port Memory Write | N | PCMP |
| Interrupt | | Y/N | PCMP, PRETRY |
| PIOR | Port IO Read | N | PCMP_D, PRETRY |
| PIOW | Port IO Write | N | PCMP, PRETRY |
| PINTA | Port Interrupt Ack | N | PCMP_D, PRETRY |
| PEOI | Port End of Interrupt | Y | PCMP, PRETRY |
| PLCK | Port Lock Request | Y | PCMP, PCMP + PDATA, PRETRY |
| PULCK | Port Unlock Request | Y | PCMP, PRETRY[1] |
| PPTC | Port Page Translation Cache Purge | Y | PCMP |
| PSPEC | Special cycle- halt, stop grant acknowledge, shutdown | N | PCMP |
| PCONR | Port Config Read | N | PCMP_D, PRETRY |
| PCONW | Port Config Write | N | PCMP, PRETRY |
| PFLUSH | Port Flush Queue | N[2] | PCMP, PRETRY |

Notes:
[1]SPS should never issue PRETRY for a PULCK if all components correctly follow the lock flow.
[2]PFLUSH ensures the SPTs in each interleave are drained.

TABLE A-3

| SP Requests | Description | Expected Responses | Other comments |
|---|---|---|---|
| PRLDe | Port Read Line Data | PSNR[I/S]_D, PSNR[M/MS]_D + PCMP[1] | Sent to home node |
| PRLC | Port Read Line Code | PSNR[I/S]_D, PSNR[M/MS]_D + PCMP[1] | |
| PRIL | Port Read and Invalidate Line | PSNRI_D, PSNRM_D + PCMP[1] | |
| PRILO | Port Read and Invalidate Line w/OWN# set | PSNRI_D, PSNRM_D + PCMP[1] | |
| PRC | Port Read Current | PSNR[I/S]_D, PSNR[M/MS]_D + PCMP[1] | |
| PSLD | Port Snoop Line Data | PSNR[I/S], PSNR[M/MS]_D | |
| PSLC | Port Snoop Line Code | PSNR[I/S], PSNR[M/MS]_D | |
| PSC | Port Snoop Line Current | PSNR[I/S], PSNR[M/MS]_D | |
| PSIL | Port Snoop and Invalidate Line | PSNRI, PSNRM_D | |
| PSILO | Port Snoop and Invalidate Line w/ OWN# set | PSNRI, PSNRM_D | |
| PSILND | Port Snoop and Invalidate Line No Data | PSNRI, PSNRM_D | |
| PILND | Port Invalidate Line No Data | PSNRI, PSNRM + PCMP[1] | Sent to home node |
| PFCL | Port Snoop Flush Cache Line | PSNRI, PSNRM + PCMP[1] | Sent to home node |
| PSFCL | Port Snoop Flush Cache Line | PSNRI, PSNRM_D | Either for a PFCL/ PSFCL flow, or for a back- invalidate |
| PMWI | Port Memory Write Line | PCMP | Either a PMWI received on the SP, or an implicit writeback based on snoop results. |
| PMWS | Port Memory Write Line | | PMWS received on SP |
| PMWE | Port Memory Write Line | | PMWE received on SP |
| PMRS | Port Memory Read Speculative | None | |
| PMR | Port Memory Read (confirm) | PDATA | |

TABLE A-3-continued

| SP Requests | Description | Expected Responses | Other comments |
|---|---|---|---|
| PMRSX | Port Memory Read Cancel | None | |
| PRNC | Non Coherent Port Memory Read | PCMP_D, PRETRY | |
| PWNC | Non Coherent Port Memory Write | PCMP | Some PWNCs may be part of a special broadcast interrupt flow |
| PIOR | Port IO Read | PCMP_D, PRETRY | |
| PIOW | Port IO Write | PCMP, PRETRY | |
| PINTA | Port Interrupt Ack | PCMP_D, PRETRY | |
| PEOI | Port End of Interrupt | PCMP | Part of a broadcast/ special flow handled by SPPC |
| PLCK | Port Lock Request | PCMP, PCMP_D | |
| PULCK | Port Unlock Request | PCMP | |
| PFLUSH | Port Flush Request | PCMP | |
| PPTC | Port Page Translation Cache Purge | PCMP | |
| PSPEC | Special cycle-halt, shutdown, stop grant acknowledge | PCMP | |
| PCONR | Port Config Read | PCMP_D, PRETRY | |
| PCONW | Port Config Write | PCMP, PRETRY | |

Notes:
[1]SPS may handle PCMP bundled with the other responses, or as a separate PCMP response.

TABLE A-4

| SP Grouping (hard coded) | Snoop Filter State (hard coded) | New Line State | PMR State | Next PRB_C State | Outgoing SP Request/Response To Home Node | To Remote Node | To Source Node |
|---|---|---|---|---|---|---|---|
| PRLC (with WB attr) | I | S | No | UPDATE | PMR | | PSNRI |
| | S | S | No | UPDATE | PMR | | PSNRS |
| | E at Source | E | No | UPDATE | PMR | | PSNRI |
| | E at Home | Pending S | No | RESPONSE_PENDING | PRLC | | |
| | E not at Home, other than Source | Pending S | Yes | RESPONSE_PENDING | | PSLC | |
| PRLC (with UC attr) | I | I | No | NoUPDATE | PMR | | PSNRI |
| | S | S (No additions in presence vector) | No | UPDATE | PMR | | PSNRS |
| | E at Source | E | No | UPDATE | PMR | | PSNRI |
| | E at Home | Pending I or S (No additions in PV) | No | RESPONSE_PENDING | PRLC | | |
| | E not at Home, other than Source | Pending I or S (No additions in PV) | Yes | RESPONSE_PENDING | | PSLC | |
| PRLD (with WB attr) | I | E | No | UPDATE | PMR | | PSNRI |
| | S | S | No | UPDATE | PMR | | PSNRS |
| | E at Source | E | No | UPDATE | PMR | | PSNRI |
| | E at Home | Pending E or S | No | RESPONSE_PENDING | PRLD | | |
| | E not at Home, other than Source | Pending E or S | Yes | RESPONSE_PENDING | | PSLD | |
| PRLD (with UC attr) | I | I | No | NoUPDATE | PMR | | PSNRI |
| | S | S (No additions in PV) | No | UPDATE | PMR | | PSNRS |
| | E at Source | E | No | UPDATE | PMR | | PSNRI |
| | E at Home | Pending I or S (No additions in PV) | No | RESPONSE_PENDING | PRLD | | |

TABLE A-4-continued

| SP Grouping (hard coded) | Snoop Filter State (hard coded) | New Line State | PMR State | Next PRB_C State | Outgoing SP Request/Response To Home Node | To Remote Node | To Source Node |
|---|---|---|---|---|---|---|---|
| | E not at Home, other than Source | Pending I or S (No additions in PV) | Yes | RESPONSE_PENDING | | PSLD | |
| PRC | I | Unchanged | No | NoUPDATE | PMR | | PSNRI |
| | S | Unchanged | No | NoUPDATE | PMR | | PSNRS |
| | E at Source | Unchanged | No | NoUPDATE | PMR | | PSNRI |
| | E at Home | Pending E[1] | No | RspPnd WoUpd | PRC | | |
| | E not at Home, other than Source | Pending E[1] | Yes | RspPndWoUpdGenPcmp | | PSC | |
| PRIL (with WB or WM attr) | (I) or (S/E only at Source) | E | No | UPDATE | PMR | | PSNRI |
| | S at Home | Pending E | No | RESPONSE_PENDING | PRIL | | |
| | S not at Home | Pending E | No | RESPONSE_PENDING | PMR | PSIL | |
| | S at Home and other nodes | Pending E | No | RESPONSE_PENDING | PRIL[2] | PSIL | |
| | E at Home | Pending E | No | RESPONSE_PENDING | PRIL | | |
| | E not at Home, other than Source | Pending E | Yes | RESPONSE_PENDING | | PSIL | |
| PRIL (with LCK attr) | (I) or (S/E only at Source) | I | No | UPDATE | PMR | | PSNRI |
| | S at Home | Pending I | No | RESPONSE_PENDING | PRIL | | |
| | S not at Home | Pending I | No | RESPONSE_PENDING | PMR | PSIL | |
| | S at Home and other nodes | Pending I | No | RESPONSE_PENDING | PRIL | PSIL | |
| | E at Home | Pending I | No | RESPONSE_PENDING | PRIL | | |
| | E not at Home, other than Source | Pending I | Yes | RESPONSE_PENDING | | PSIL | |
| PIL | I | | | Not possible | | | |
| | S/E only at Source | E | No | UPDATE | | | PSNRI |
| | S at Source and other nodes | Pending E | No | RESPONSE_PENDING | PSIL if S at Home | PSIL if S at Remote | |
| | S, other than Source | | | Not possible | | | |
| | E, other than Source | | | Not possible | | | |
| PRILO | (I) or (S/E only at Source) | E | No | UPDATE | PMR | | PSNRI |
| | S at Home | Pending E | No | RESPONSE_PENDING | PRILO | | |
| | S not at Home | Pending E | No | RESPONSE_PENDING | PMR | PSILO | |
| | S at Home and other nodes | Pending E | No | RESPONSE_PENDING | PRILO[2] | PSILO | |
| | E at Home | Pending E | No | RESPONSE_PENDING | PRILO | | |
| | E not at Home, other than Source | Pending E | Yes | RspPndGenPcmp | | PSILO | |
| PILND | (I) or (S/E only at Source) | E | No | UPDATE | | | PSNRI |
| | S at Home | Pending E | No | RESPONSE_PENDING | PILND | | |
| | S not at Home | Pending E | No | RESPONSE_PENDING | | PSILND | |
| | S at Home and other nodes | Pending E | No | RESPONSE_PENDING | PILND | PSILND | |
| | E at Home | Pending E | No | RESPONSE_PENDING | PILND | | |
| | E not at Home, other than Source | Pending E | No | RESPONSE_PENDING | | PSILND | |
| PFCL | (I) or (S/E only at Source) | I | No | UPDATE | | | PSNRI |
| | S at Home | Pending I | No | RESPONSE_PENDING | PFCL | | |
| | S not at Home | Pending I | No | RESPONSE_PENDING | | PSFCL | |
| | S at Home and other nodes | Pending I | No | RESPONSE_PENDING | PFCL | PSFCL | |
| | E at Home | Pending I | No | RESPONSE_PENDING | PFCL | | |
| | E not at Home, other than Source | Pending I | No | RESPONSE_PENDING | | PSFCL | |

TABLE A-4-continued

| SP Grouping (hard coded) | Snoop Filter State (hard coded) | New Line State | PMR State | Next PRB_C State | Outgoing SP Request/Response To Home Node | To Remote Node | To Source Node |
|---|---|---|---|---|---|---|---|
| PMW[I/E/S]_D[3] | E[4] | Pending [I/E/S] | No | CMP_PENDING | PMW[I/E/S]_D | | |
| | Not E (Error) | I | No | NoUpdate | | | PCMP |
| PMW[I/E/S] | E[3] | Pending [I/E/S] | No | UPDATE | | | PCMP |
| | Not E (Error) | I | No | NoUpdate | | | PCMP |
| PCLR | I | I | No | UPDATE | | | |
| | S/E | Reset presence bit for Source, Change to I if all reset. | No | UPDATE | | | |
| | SF Bypass Mode | I | No | NoUPDATE | | | |
| | Error | I | No | NoUpdate | | | |
| Reserved | | | | Reserved - do not validate | | | |
| PSLC (with WB attr) | I | S | No | UPDATE | | | PSNRI |
| | S | S | No | UPDATE | | | PSNRS |
| | E at source | E | No | UPDATE | | | PSNRI |
| | E, other than Source | Pending S | No | RESPONSE_PENDING | | PSLC | |
| PSLD (with WB attr) | I | E | No | UPDATE | | | PSNRI |
| | S | S | No | UPDATE | | | PSNRS |
| | E at Source | E | No | UPDATE | | | PSNRI |
| | E, other than Source | Pending E or S | No | RESPONSE_PENDING | | PSLD | |
| PSIL of zero length | I | | | Not possible | | | |
| | S/E only at Source | E | No | UPDATE | | | PSNRI |
| | S at Source and other nodes | Pending E | No | RESPONSE_PENDING | | PSIL if S at Remote | |
| | S, other than Source | | | Not possible | | | |
| | E, other than Source | | | Not possible | | | |
| PSIL of non-zero length (with WB or WM attr) | (I) or (S/E only at Source) | E | No | UPDATE | | | PSNRI |
| | S, other than Source[5] | Pending E | No | RESPONSE_PENDING | | PSIL | |
| | E, other than Source | Pending E | No | RESPONSE_PENDING | | PSIL | |
| PSIL of non-zero length (with LCK attr) | I | I | No | UPDATE | | | PSNRI |
| | S/E only at Source | I | No | UPDATE | | | PSNRI |
| | S, other than Source[5] | Pending I | No | RESPONSE_PENDING | | PSIL | |
| | E, other than Source | Pending I | No | RESPONSE_PENDING | | PSIL | |
| PSILO | (I) or (S/E only at Source) | E | No | UPDATE | | | PSNRI |
| | S, other than Source[5] | Pending E | No | RESPONSE_PENDING | | PSILO | |
| | E, other than Source | Pending E | No | RspPndGenPcmp | | PSILO | |
| PSILND | (I) or (S/E only at Source) | E | No | UPDATE | | | PSNRI |
| | S, other than Source[5] | Pending E | No | RESPONSE_PENDING | | PSILND | |
| | E, other than Source | Pending E | No | RESPONSE_PENDING | | PSILND | |
| PSFCL | (I) or (S/E only at Source) | I | No | UPDATE | | | PSNRI |
| | S, other than Source | Pending I | No | RESPONSE_PENDING | | PSFCL | |
| | E, other than Source | Pending I | No | RESPONSE_PENDING | | PSFCL | |
| | For PLCK, PULCK, PWNC-brd intr | | | | To IOHs | To SNC's | To Source Node |

TABLE A-4-continued

| SP Grouping (hard coded) | Snoop Filter State (hard coded) | New Line State | PMR State | Next PRB_C State | To Home Node | Outgoing SP Request/Response To Remote Node | To Source Node |
|---|---|---|---|---|---|---|---|
| PLCK | N/A | LockState | | LckPnd1 | | PLCK | |
| PULCK | N/A | BrcstState | | UnlckPnd | | PULCK | |

Notes:
[1] The snoop filter is not updated for PRC and PSC transactions.
[2] Combining snoop response and data requires the SPS to either store the data or strip the snoop response from data and pass the data on to the source node and send the snoop response separately.
[3] PMW[I/S/E] are individual entries in the implementation.
[4] Snoop filter lookup is not required for memory update (PMWx) requests, but SPT lookup is still needed.
[5] The cache line may be either in S or I state at the source node.

TABLE A-5

| Incoming Response | Pending State | PMR State | PRB State | New Line State | PMR State | PRB State | Req To Home | Response to Source |
|---|---|---|---|---|---|---|---|---|
| PSNRI | I, IorS | No | various | IState | No | Update | None | PSNRI |
| | I, IorS | Yes | | IState | No | Update | PMR | PSNRI |
| | S | No | | SState | No | Update | None | PSNRI |
| | S | Yes | | SState | No | Update | PMR | PSNRI |
| | E, EorS | No | | EState | No | Update | None | PSNRI |
| | E | No | | EState | No | NoUpdate | None | PSNRI |
| | E, EorS | Yes | | EState | No | Update | PMR | PSNRI |
| | E | Yes | | EState | No | NoUpdate | PMR | PSNRI |
| PSNRS | S, IorS, EorS | No | various | SState | No | Update | None | PSNRS |
| | S, IorS, EorS | Yes | | SState | No | Update | PMR | PSNRS |
| | E | No | | EState | No | NoUpdate | None | PSNRS |
| | E | Yes | | EState | No | NoUpdate | PMR | PSNRS |
| PSNRM | I, IorS | Yes/No | Various | IState | No | CmpPnd | None | None[1] |
| | I, IorS | Yes/No | SnrmPend | IState | No | Update | None | PCMP |
| | S | Yes/No | Various | SState | No | CmpPnd | None | None |
| | S | No | SnrmPend | SState | No | Update | None | PCMP |
| | E, EorS | Yes/No | RspPnd | EState | No | CmpPnd | None | None |
| | E | Yes/No | RspPndWoUpd | EState | No | CmpPndWoUpd | None | None |
| | E, EorS | Yes/No | Various | EState | No | Update | None | PCMP |
| | E | Yes/No | SnrmPndWoUpd | EState | No | NoUpdate | None | PCMP |
| PSNRMS | S, EorS, IorS | Yes/No | RspPnd | SState | No | CmpPnd | None | None |
| | S, EorS, IorS | Yes/No | SnrmPend | SState | No | Update | None | PCMP |
| | E | Yes/No | RspPndWoUpd | EState | No | CmpPndWoUpd | None | None |
| | E | Yes/No | RspPndWoUpdGenPCmp | EState | No | NoUpdate | None | PCMP |
| PSNRM_CMP (RN == HN) | I, IorS | Yes/No | RspPnd | IState | No | Update | None | PCMP |
| | S, EorS | Yes/No | RspPnd | SState | No | Update | None | PCMP |
| | E | Yes/No | RspPnd | EState | No | Update | None | PCMP |
| PSNRMS_CMP | various | Yes/No | RspPnd | SState | No | Update | None | PCMP |
| PCMP_COH | I | Yes/No | RspPnd | IState | No | SnrmPnd | None | None |
| | S | Yes/No | RspPnd | SState | No | SnrmPnd | None | None |
| | E | Yes/No | RspPnd | EState | No | SnrmPnd | None | None |
| | EorS | Yes/No | RspPnd | EorSState | No | SnrmPnd | None | None |
| | I | No | CmpPnd | IState | No | Update | None | PCMP |
| | S | No | CmpPnd | SState | No | Update | None | PCMP |
| | E | No | CmpPnd | EState | No | Update | None | PCMP |
| | S, E | No | CmpPndWoUpd | SState | No | NoUpdate | None | PCMP |
| PCMP_COH2[2] | IorS | Yes/No | RspPnd | IorSState | No | SnrmPnd | None | None |
| | E | No | RspPndWoUpd | EState | No | SnrmPndWoUpd | None | None |
| PCMP_Lock | LockState | No | LckPnd1 | LockState | 0 | LckPnd2 | PFLUSH | 0 |
| | LockState | No | LckPnd2&ToIOH | LockState | 0 | LckPnd3 | PLCK | 0 |
| | LockState | No | LckPnd2&ToSNC | LockState | 0 | CmpPndWoUpd | 0 | 0 |
| | LockState | No | LckPnd1 | LockState | 0 | NoUpdate | 0 | PCMP |
| PCMP_Ulock | BrcstState | No | UnLckPnd | BrcstState | 0 | LckPnd2 | PULCK | 0 |
| | BrcstState | No | LckPnd2 | BrcstState | 0 | NoUpdate | 0 | PCMP |

Notes:
[1] Snoop response would be forwarded to requesting node directly so the SPPC does not generate response.
[2] Overflow cases. For PRLD UC and PRLC UC, separated PCMP for a PRC.

The invention claimed is:

1. An apparatus including at least two nodes, each node connected to at least two processors, comprising:
   a request pipeline;
   a configuration access to receive a program input from a user of the apparatus;
   a request protocol table that is user-programmable and re-programmable during an execution of the apparatus with the program input, the request protocol table configured to include a plurality of entries, each entry specifying how to process a first message type in the request pipeline;
   a response pipeline;
   a response protocol table including a plurality of entries, each entry specifying how to process a second message type in the response pipeline; and
   a snoop pending table operative to generate a message responsive to an entry in at least one of the request protocol table and the response protocol table.

2. An apparatus according to claim 1, wherein the response protocol table is user-programmable and re-programmable during an execution of the apparatus with the program input.

3. An apparatus according to claim 1, wherein the snoop pending table is operative to generate the message responsive to an entry in the request protocol table and a datum in a snoop filter.

4. An apparatus according to claim 3, wherein the snoop pending table is operative to direct the message to a node that originated a second message inserted into the request pipeline.

5. An apparatus according to claim 3, wherein the snoop pending table is operative to direct the message to at least a second node distinct from a first node that originated a second message inserted into the request pipeline.

6. An apparatus according to claim 5, further comprising a response tracking table operative to track a third message inserted into the response pipeline from the second node responsive to the message generated by the snoop pending table.

7. An apparatus according to claim 6, wherein the snoop pending table is operative to generate a fourth message directed to the first node responsive to the third message.

8. An apparatus according to claim 1, further comprising staging registers to buffer the program input.

9. An apparatus according to claim 1, wherein the request protocol table is stored in a volatile memory.

10. An apparatus according to claim 1, wherein the request protocol table identifies a state of the apparatus, the state of the apparatus being drawn from a set including Invalid, Shared, Exclusive at Home, Exclusive at Source, and Exclusive not at Home, other than Source.

11. A method for using a central protocol logic in a system including at least two nodes, each node connected to at least two processors, comprising:
   receiving a message from a node by the central protocol logic;
   determining a first type of the message;
   placing the message in one of a request pipeline and a response pipeline based on the first message type;
   determining a second type of the message;
   accessing an entry in a protocol table based on the second message type;
   updating a state machine based on the entry in the protocol table;
   receiving a program input at a configuration access from a user of the central protocol logic; and
   programming the protocol table with the program input.

12. A method according to claim 11, wherein:
   determining a first type of the message includes determining that the message is a request;
   placing a message includes placing the message in the request pipeline;
   accessing an entry includes accessing the entry in a request protocol table; and
   the method further comprises responding to the message.

13. A method according to claim 12, further comprising accessing a snoop filter.

14. A method according to claim 13, wherein updating a state machine includes sending at least one snoop message to at least a second node.

15. A method according to claim 12, wherein responding to the message includes responding to the message only if a second response to the message is not sent from a second node.

16. A method according to claim 11, wherein:
   determining a first type of the message includes determining that the message is a response;
   placing a message includes placing the message in the response pipeline; and
   accessing an entry includes accessing the entry in a response protocol table.

17. A method according to claim 11, further comprising:
   receiving another program input at the configuration access from the user; and
   re-programming the protocol table with the another program input.

18. A method according to claim 11, wherein accessing an entry in a protocol table includes identifying a state of the central protocol logic, the state of the apparatus being drawn from a set including Invalid, Shared, Exclusive at Home, Exclusive at Source, and Exclusive not at Home, other than Source.

19. A method for using a distributed protocol logic in a system including at least two nodes, each node connected to at least two processors, comprising:
   programming a central protocol logic;
   receiving a message;
   determining if processing the message involves communicating with one or more nodes;
   if processing the message involves communicating with more than one node, sending the message to the central protocol logic;
   receiving a program input while using the distributed protocol logic; and
   reprogramming the central protocol logic with the program input.

20. A method according to claim 19, further comprising, if processing the message involves communicating with exactly one node, sending the message to the node.

21. A method according to claim 19, wherein sending the message includes:
   selecting one of a plurality of central protocol logics to which the message should be sent; and
   sending the message to the selected central protocol logic.

22. A method according to claim 21, wherein selecting one of a plurality of central protocol logics includes:
   determining a memory address of the message; and
   selecting the central protocol logic that processes the memory address.

23. A method according to claim 19, wherein determining if processing the message involves communicating with one or more nodes includes identifying a state of the central protocol logic, the state of the apparatus being drawn from a set including Invalid, Shared, Exclusive at Home, Exclusive at Source, and Exclusive not at Home, other than Source.

24. An article comprising a machine-accessible medium having associated data that, when accessed, results in a machine including at least two nodes, each node connected to at least two processors:
   receiving a message from a node by a central protocol logic;
   determining a first type of the message;
   placing the message in one of a request pipeline and a response pipeline based on the first message type;
   determining a second type of the message;
   accessing an entry in a protocol table based on the second message type;
   updating a state machine based on the entry in the protocol table;
   receiving a program input at a configuration access from a user of the central protocol logic; and
   programming the protocol table with the program input.

25. An article according to claim 24, wherein:
   the associated data for determining a first type of the message includes associated data for determining that the message is a request;
   the associated data for placing a message includes associated data for placing the message in the request pipeline;
   the associated data for accessing an entry includes associated data for accessing the entry in a request protocol table; and
   the machine-accessible medium has further associated data that, when accessed, results in the machine responding to the message.

26. An article according to claim 24, wherein:
   the associated data for determining a first type of the message includes associated data for determining that the message is a response;
   the associated data for placing a message includes associated data for placing the message in the response pipeline; and
   the associated data for accessing an entry includes associated data for accessing the entry in a response protocol table.

27. An article according to claim 24, wherein accessing an entry in a protocol table includes identifying a state of the central protocol logic, the state of the apparatus being drawn from a set including Invalid, Shared, Exclusive at Home, Exclusive at Source, and Exclusive not at Home, other than Source.

28. An article comprising a machine-accessible medium having associated data that, when accessed, results in a machine including at least two nodes, each node connected to at least two processors:
   receiving a program for programming a central protocol logic;
   receiving a message;
   determining if processing the message involves communicating with one or more nodes;
   if processing the message involves communicating with more than one node, sending the message to the central protocol logic;
   receiving another program input; and
   reprogramming the central protocol logic with the another program input.

29. An article according to claim 28, the machine-accessible medium having further associated data that, when accessed, result in the machine, if processing the message involves communicating with exactly one node, sending the message to the node.

30. An article according to claim 28, wherein determining if processing the message involves communicating with one or more nodes includes identifying a state of the central protocol logic, the state of the apparatus being drawn from a set including Invalid, Shared, Exclusive at Home, Exclusive at Source, and Exclusive not at Home, other than Source.

* * * * *